United States Patent [19]
Henley

[11] 3,707,749
[45] Jan. 2, 1973

[54] VARIABLE PRESSURE BED ROLLER

[75] Inventor: Virgil E. Henley, Akron, Ohio 44300

[73] Assignee: The General Tire & Rubber Company

[22] Filed: Oct. 12, 1970

[21] Appl. No.: 79,846

[52] U.S. Cl. .............................................. 29/113 R
[51] Int. Cl. .............................................. B21b 31/32
[58] Field of Search ............. 29/113 R, 113 AD, 132; 152/361, 356, 354

[56] References Cited

UNITED STATES PATENTS

| | | | |
|---|---|---|---|
| 2,186,178 | 1/1940 | Shoemaker | 152/356 |
| 2,703,128 | 3/1955 | Darrow | 152/356 |
| 3,373,066 | 3/1968 | Hindin | 152/356 X |
| 3,442,315 | 5/1969 | Mirtain | 152/354 |
| 3,095,027 | 6/1963 | Weber | 152/361 X |
| 3,131,744 | 5/1964 | Boussu et al. | 152/361 |
| 3,335,777 | 8/1967 | Hutch | 152/361 |
| 1,789,143 | 1/1931 | Kraft | 29/113 R X |
| 2,984,335 | 5/1961 | Rhodes | 29/113 R |
| 3,383,884 | 5/1968 | Meyer | 29/113 R X |

Primary Examiner—Alfred R. Guest
Attorney—Frank C. Rote, Jr. and Harry F. Pepper, Jr.

[57] ABSTRACT

In applying pressure to sheets of pliable material, solid rollers do not provide for variation in pressure dwell time. Variable pressure rollers that do provide variation in pressure dwell time tend to crown or distort except where complicated anti-distortion mechanisms are utilized. This invention is a variable pressure bed roller for application of pressure to sheets of pliable material that is crown and distortion resistant and of extremely simple design.

5 Claims, 5 Drawing Figures

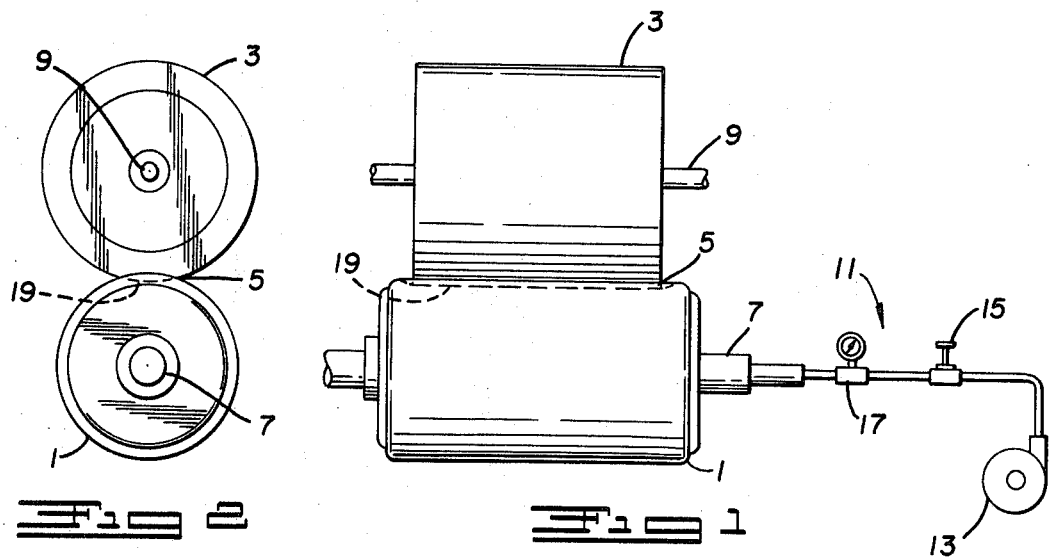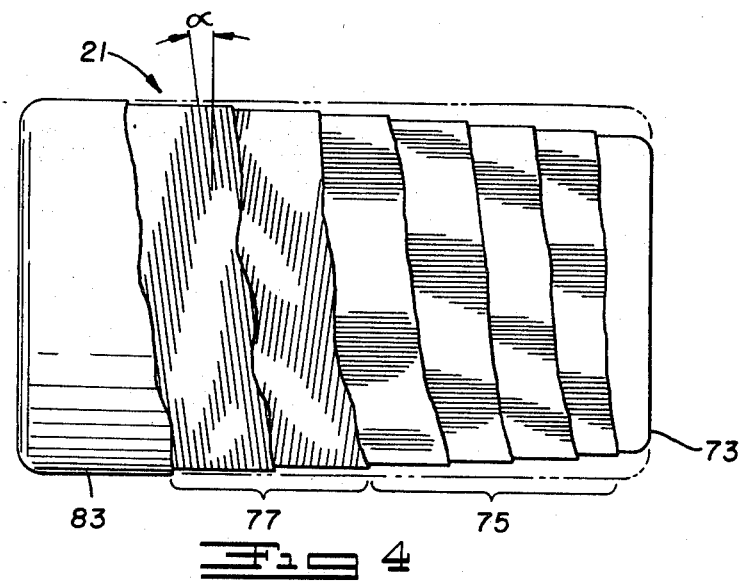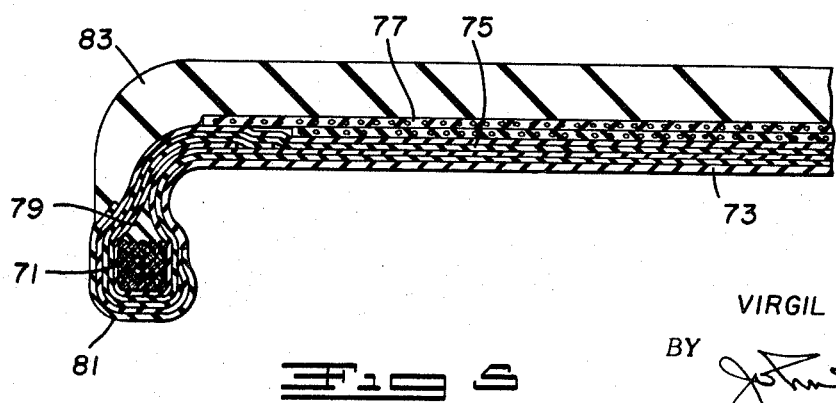

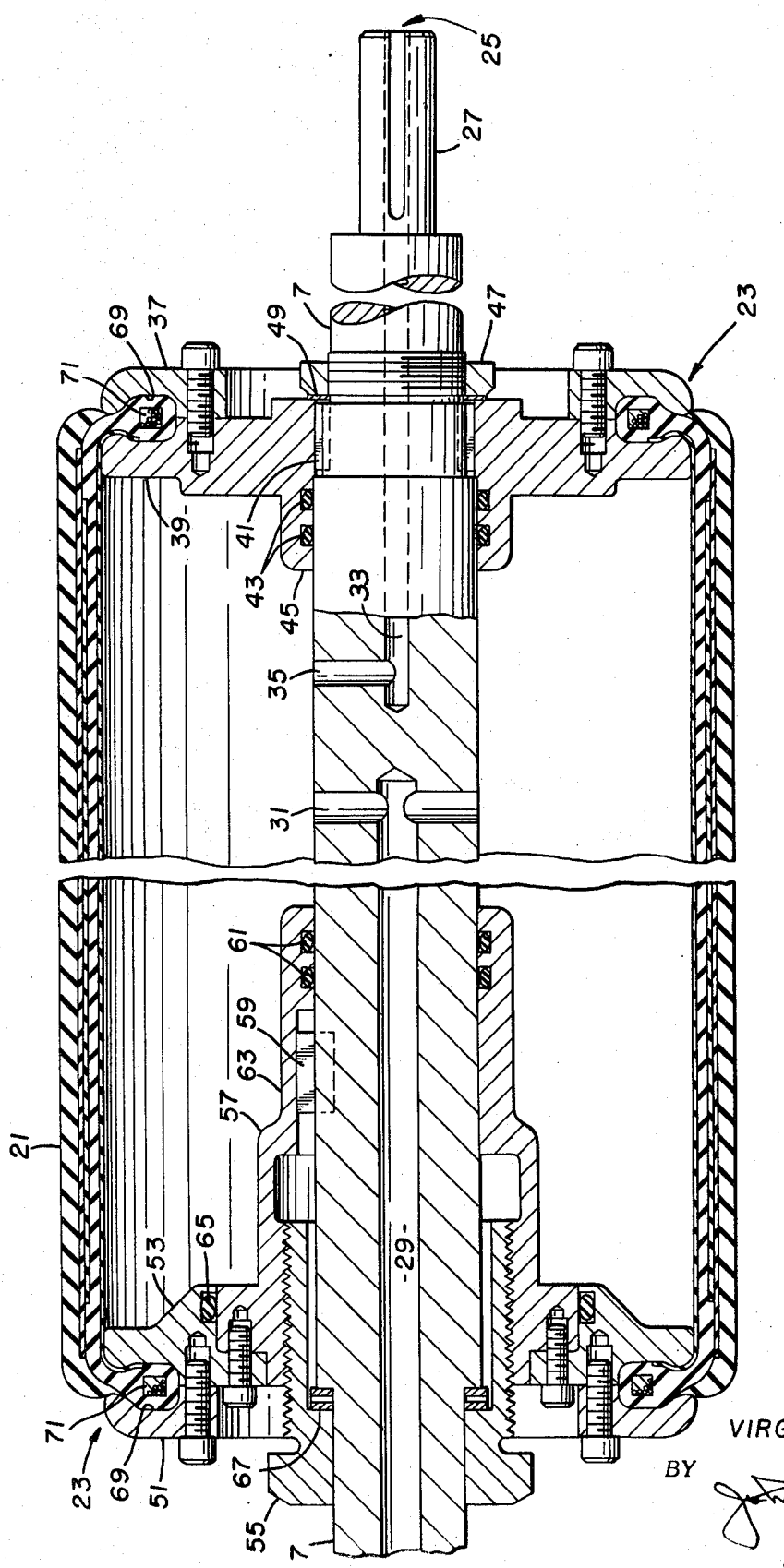

VARIABLE PRESSURE BED ROLLER

BACKGROUND OF THE INVENTION

1. Field of the Invention

This invention relates to the field of calendering and other rolling processes. More particularly, this invention relates to embossing operations wherein variation in pressure dwell time is employed.

2. Description of the Prior Art

Rollers have long been used in various processes to apply pressure to sheets of pliable materials, such as in paper making, in photographic film making, in clothes washing, and in calendering plastics. Generally, these pressure applications comprise passing sheets of pliable materials between two or more rollers, one roller operating as the working surface and known as the "bed" roller and the other roller or rollers carrying the working surfaces such as embossing means and known as the "working" roller.

In pressure applications involving rollers, it has been found that the work done to the sheets of pliable materials is a function of both the pressure exerted by the rollers on the sheet and the dwell time or amount of time the sheet is subject to the pressure. With respect to embossing plastic materials, pressure is limited to the strength of the material, i.e., too high of a pressure will cause the plastic to tear, whereas dwell time is not a function of any property of the material. Therefore, where relatively soft pliable materials are sought to be embossed, high pressure is prohibited due to the strength of the material and efficient embossing becomes a function of the embossing dwell time, see U.S. Pat. No. 2,585,915.

Methods of increasing and decreasing the dwell time during rolling are known and generally comprise deflating the bed roller to increase the "footprint" or contact area between the two rollers. Ordinarily, the bed roller is made wider than the working roller so that during operation of the deflated roller the working roller will make the footprint evenly along the working surface so as to provide equal pressure along the full nip or contact area between the rollers. Unfortunately, where deflatable bed rollers are used there are problems known as "crowning" or "pantographic distortion." "Crowning" is the tendency of the deflated roller to expand more at the center than at the ends; this is because expansion of the roller is inhibited at the ends due to the mounting means whereas generally it is not restrained at the middle. "Pantographic distortion" is the tendency of the roller to deflate unevenly or to twist slightly due to the massive torque provided at one end of the roller by the drive mechanism.

Although inflatable rollers are known in the art, see U.S. Pat. Nos. 207,287; 338,769; 654,194; 2,144,793; 2,341,636; and 2,704,392; the distortion and crowning has been so severe as to warrant special treatment. It was found long ago that simplified control mechanisms would not provide the degree of anti-crowning or anti-distortion sufficient to meet the needs of high pressure rolling processes, see U.S. Pat. No. 1,593,653. The art has therefore been forced to use complicated mechanical and hydraulic control mechanisms, see U.S. Pat. Nos. 649,145; 1,563,130; 2,908,964; 2,970,339; 3,023,695; 3,043,211; 3,050,829; 3,070,872; 3,095,634; 3,098,284; and 3,140,512. These mechanisms all have the inherent disadvantages that they are complicated and require much attention, that they comprise numerous parts that are subject to wear and tear, and that they are expensive and their maintenance is extremely costly.

This invention is an extremely simple bed roller for variable pressure and high pressure rolling operations that is capable of increased dwell time or change of footprint without distortion or crowning, and that does not exhibit the disadvantages of the aforementioned prior art devices. The bed roller of this invention has all of the anti-crowning and anti-distortion mechanism built into its wall or shell and is a unitary structure that does not utilize separate parts to control distortion or crowning tendencies. The roller is extremely simple to build and operate and is capable of rolling a wide variety of pliable materials over a wide variety of thicknesses and widths. In addition, it has a working surface that may be patterned and/or easily renewed.

Therefore, the main object of this invention is a variable pressure roller for calendering and otherwise rolling sheets of pliable material that is distortion and crowned resistant. Other objects of the invention include a variable pressure bed roller that is inordinately simple in design, that is free of complicated mechanical and hydraulic restraints and devices, that houses all of the distortion and crown compensating mechanisms within the roller shell, that is easy to manufacture and install, that has a long working life due to the simplified construction thereof, and that is applicable to processing a wide variety of pliable materials. These and other objects of the invention will become more apparent upon reading the Description of the Preferred Embodiment that follows in conjunction with the drawings attached.

SUMMARY OF THE INVENTION

This invention concerns a variable pressure bed roller for calendering sheets of pliable materials comprising in combination a hollow, fluid-impervious, pressure-resistant cylindrical shell; a shaft centrally positioned in the shell; fluid-tight means for mounting each end of the shell on the shaft; means for introducing fluid under pressure into the shell; wherein the shell comprises a fluid impervious inner shell liner, an inner shell bonded to the outside of the liner comprising at least one layer of spaced cords in a cured elastomeric matrix wherein the cords are aligned parallel to the shaft and terminate in each of the fluid-tight mounting means, a center distortion and crown resistant shell bonded to the outside of the inner shell comprising an even number of layers of evenly spaced cords in a cured elastomeric matrix wherein the layers of cords are aligned at alternating equal acute angles with a plane perpendicular to the shaft and wherein the ends of the cords terminate in each of the fluid-tight mounting means, and an outer shell liner bonded to the center shell comprising at least one layer of cured elastomeric material for pressure contact with sheets of pliable materials.

DESCRIPTION OF THE DRAWINGS

FIG. 1 is a front view of a simple roller set using a variable pressure bed roller of this invention.

FIG. 2 is an end elevation view of the roller set shown in FIG. 1.

FIG. 3 is a cross-sectional plane view of one fully assembled embodiment of this invention.

FIG. 4 is a cut-away view of one embodiment of the shell of the bed roller of this invention.

FIG. 5 is a close-up cross-sectional view of an end of one embodiment of the shell of the bed roller of this invention.

DESCRIPTION OF THE PREFERRED EMBODIMENT

This invention concerns rollers of the variable pressure type for calendering and otherwise applying pressure to sheets of pliable materials. These rollers are generally cylindrical shapes having a diameter ranging from 6 inches to 6 feet and more and widths ranging from 1 foot to 10 feet and more in association with either a single working roller of equal or smaller size or in various combinations with a plurality of rollers such as are known by the designations "L-calender" and "Z-calender." The application of pressure may be utilized for the aforedescribed embossing of plastics or other processes such as squeezing for making paper, smoothing in the manufacture of photographic film, buffing such as in the manufacture and treatment of leather materials, and the like. All of these applications of pressure are contemplated in this invention; however, the Description of the Preferred Embodiment herein will be limited to the description of a roller for the purposes of embossing a sheet of pliable material.

The types of pliable materials for which this roller is usable are virtually unlimited; examples include wet pulp mixtures in the manufacture of paper, cellulosic materials in the manufacture of films, and plastic materials in the manufacture of wall covering, book covering, floor tile, table cloths, etc. These materials may range in thickness from less than 1 mil to greater than 200 mils and range in widths from less than 1 inch to greater than 10 feet. With respect to plastic materials, those of the thermoplastic type such as vinyl-containing polymers and copolymers are especially amenable to processing with the roller of this invention. Examples of polymers and other plastic compositions usable herein include acrylonitrile-butadiene-styrene plastics, acetyl resins, acrylics, alkyd resins, amino resins, cellulosics, epoxy resins, fluorocarbons, phenolics, polystyrene, polyamides, polycarbonates, polyesters, polythenes, polypropylene, polyurethane plastics, silicones, vinyl polymers and copolymers, and the like. In addition, these polymeric materials may contain polymeric additives such as elastomers, for instance, acrylic rubber, butadiene-styrene rubber, polychloroprene, chlorosulfonated polyethylene, fluorocarbons, isobutylene-isoprene, isoprene and butadiene rubbers, nitrile-butadiene rubbers, polyisobutylene, polysulfide, polysilicones, and polyurethane rubbers, as well as natural rubber. All of these polymeric materials may be made into sheet form which may undergo application of pressure by the roller of this invention.

Turning now to the drawings wherein like numerals identify like elements throughout the five figures, FIG. 1 shows a simplified roller set using the variable pressure bed roller of this invention. In the drawing is shown variable pressure bed roller 1 of this invention arranged parallel and in contact with work roller 3 so as to provide a nip area 5 for introduction of sheets of pliable material thereto. Bed roller 1 and work roller 3 are mounted respectively on shafts 7 and 9 for rotary movement. Shafts 7 and 9 are mutually adjustable so that when bed roller 1 is deflated they can be drawn together to maintain the squeeze pressure at nip area 5 at a desired level. Shaft 7 is connected to a drive means (not shown) and to means 11 for introducing fluid under pressure to bed roller 1. Means 11 generally comprises hydraulic pump 13 in combination with control valve 15 and pressure indicator 17.

When bed roller 1 is slightly deflated and the distance between shafts 7 and 9 adjusted to provide a desired working pressure at nip area 5, footprint 19 (the area of contact between bed roller 1 and work roller 3) is increased from that of mere tangential contact to a wide area shown in dotted lines in FIG. 1 and seen better in the end elevation view in FIG. 2. As sheets of pliable material are introduced into nip area 5 and passed between bed roller 1 and work roller 3, they are subject to the pressure throughout their travel across footprint 19 so as to provide a greater time for the application of pressure and thus to increase the efficiency of the pressure application.

Note that bed roller 1 is wider than work roller 3; this is to reduce pantographic distortion of the surface of variable pressure bed roller 1 at the area of contact with the edge of work roller 3 during deflated roller operation. Variable pressure bed roller 1 operates at a pressure of about 400 psi which is created therein by a fluid, preferably a liquid. With respect to liquids usable herein, the preferred is water or hydraulic fluid as they are relatively inexpensive and safe and provide minimal damage to the shaft and other internal elements of bed roller 1. Gases may also be used such as steam and air and both are contemplated in this invention.

FIG. 2 is an end elevation view of the roller set shown in FIG. 1 and more fully shows the increase in footprint 19 caused by deflating variable pressure bed roller 1 and adjusting the distance between shafts 7 and 9. This deflating of bed roller 1 is entirely different from increasing the pressure between the respective rollers; increasing the pressure will eventually damage the sheet of pliable material and may, if carried far enough, rupture the sheet and render it useless whereas increasing the footprint between the respective rollers by deflating the bed roller and adjusting the distance between the shafts will not necessarily increase the pressure (although this is possible) but will maintain it constant and increase the area of contact (dwell time) between the two rollers.

FIG. 3 shows in cross-section a plane view of one fully assembled embodiment of the roller of this invention and comprises a hollow, fluid-impervious, pressure-resistant cylindrical shell 21, which will be described in more detail later, shaft 7 centrally positioned in shell 21, fluid-tight means 23 for mounting each end of shell 21 on shaft 7, and means 25 for introducing fluid under pressure into shell 21.

Shaft 7 is positioned along the major axis and passes completely through cylindrical shell 21. At one end of shaft 7 is exterior drive connection 27 comprising a key slotted journal or other like embodiment for connection to a power drive (not shown). Fluid-tight mounting means 23 mount the ends of shell 21 on shaft 7. Outboard of means 23 on shaft 7 are bearing journals (not shown) for mounting bed roller 1 in a rolling machine.

Contained in shaft 7 is means 25 for introducing fluid under pressure into shell 21. Means 25 comprises large diameter intake borehole 29, entering shell 21 through one end of shaft 7, and terminating at distributor holes 31 and a smaller diameter outlet borehole 33 starting with exit holes 35 and leading out through the other end of shaft 7. Intake borehole 29 may be connected to means 11 for introducing fluid under pressure to bed roller 1 (see FIG. 1) and outlet borehole 33 may be connected to a drain or to a return loop to means 11. The difference in diameters between borehole 29 and borehole 33 is for the purpose of creating a pressure drop within shell 21 during passage of fluid therethrough.

Fluid-tight means 23 mounts each end of shell 21 on shaft 7 and at one end of shaft 7 comprises circular outer closure plate 37 fastened to circular inner closure plate 39 wherein both plates are complementally received on shaft 7 and mechanically attached thereto by key joints 41 and sealed against escape of fluid by inner "o" ring seals 43, located in a boss 45 extending inward from closure plate 39, and outer packing gland 47 and seal 49. At the other end of shaft 7 means 23 comprises circular outer closure ring 51 fastened to circular inner closure ring 53 wherein inner ring 53 is threadably mounted on shell tensioning nut 55, that in turn is annularly received on shaft 7. Inner closure ring 53 is attached to shaft 7 through an annular hub 57. Hub 57 is keyed to shaft 7 by key joint 59, and sealed against escape of fluid by "o" ring seal 61 located in a boss 63 extending inward from hub 57 and "o" ring seal 65 in inner closure ring 53. Tensioning nut 55 is tightened inward to draw against bearing 67 whereupon further tightening moves mounting means 23 outward along shaft 7 thereby putting shell 21 under tension.

The outer radial extremities of fluid-tight mounting means 23 is in the shape of an undercut recess 69 formed one-half by outer closure plate 37 (and ring 51 at the other end) and one-half by inner closure plate 39 (and ring 53 at the other end). Into recess 69 is complementally received the ends of shell 21 including a circular wire bed 71 wherein the layers of shell 21 are turned thereover (in a return loop). The elastomer comprising shell 21 is squeezed between bead 71 and the surface of recess 69 when the closure plates (and rings) are bolted tightly together thereby sealing against escape of fluid from within shell 21.

Other fluid-tight mounting means are possible for means 23 such as that disclosed in U.S. Pat. Nos. 649,145 and 2,704,392 and are fully contemplated herein.

In FIG. 4 is a cut-away view of one embodiment of shell 21 of bed roller 1 of this invention. Shell 21 comprises, starting with the inside surface, fluid impervious inner shell liner 73 which generally comprises a layer of cured elastomeric material to ensure against leakage of fluid from the interior of shell 21. Shell liner 73 may comprise a plurality of layers; however, usually one layer is sufficient to seal shell 21 against leakage of fluid. Shell liner 73 is generally made from a fluid-impervious elastomer such as a nitrile elastomer so as to be impervious to the passage of fluid therethrough. It is preferred that it not contain any reinforcing fibers.

Over inner shell liner 73 and fully bonded thereto lies inner shell 75 that comprises at least one but preferably more than one layer of spaced cords in a cured elastomeric matrix wherein the cords are aligned parallel to shaft 7 and terminate at each end about beads 71 for fluid-tight engagement with means 23. It is imperative to the successful operation of bed roller 1 of this invention that the cords in the layers of inner shell 75 are parallel to shaft 7. This construction, termed "radial cord construction" in the tire industry, prevents bed roller 1 from pantographically distorting during deflation and maintains footprint 19 at a constant width throughout the working length of bed roller 1. The side edges of the layers are also parallel to shaft 7 and are butt-joined (in contrast to overlap joined) during construction.

The cord-containing layers of inner shell 75 are generally manufactured by calendering a single sheet of uncured elastomer (about 10 to 20 mils thick), arranging a single layer of spaced apart cords on the sheet, said cords having a diameter of from 10 to 200 mils and spaced from 10 to 30 cords per inch width, laying down a second layer of uncured elastomer on top of the cord layer to form a three-layer laminate, and then calendering the laminate under pressure so as to force the two layers of uncured elastomer together to surround and embed the cords therein. The cord layer may comprise textile cords, e.g., rayon, cotton, nylon, polyester, or other cords such as glass fibers and steel wire. Although the term "cord" is technically defined as a highly twisted yarn, it is used herein to denote virtually any type of rectilinear construction including filaments, fibers, threads, cords, yarns, strands, and wires; thus, a steel wire is termed a "cord" for the purposes of this invention.

The cords should be in a spaced apart arrangement preferably in some sort of a pattern. The greatest degree of cord strength is obtained when the cords are evenly spaced apart, however, patterns containing a plurality of cords in separate parallel bundles are also usable herein.

Over the outside of inner shell 75 and fully bonded thereto lies center shell 77 that comprises an even number of layers of spaced cords in a cured elastomeric matrix wrapped helically about shell 21 wherein the cords are aligned at alternating equal acute angles with a plane perpendicular to shaft 7 and further wherein the ends of each cord terminate at the ends of shell 21. Whereas the layers of spaced cords in elastomeric matrix comprising inner shell 75 may be in any numer, such as three or more, the layers comprising center shell 77 are in pairs or equal numbers, that is 2, 4, 6, 8, etc. These layers are slightly thicker than the layers making up inner shell 65, e.g., 90 mils as compared to 35 mils; however, they are manufactured the same way, i.e., calandered laminates comprising two outer sheets of uncured elastomeric material and a center layer of spaced cords.

The cords in the layers of center shell 77 are helically wound about shell 21 at a sharply acute angle with a plane perpendicular to shaft 7. Thus, the helical winding is almost a circumferential winding and the axes of the cords are almost parallel to the circumference. In this position the cords resist over-expansion of any portion of shell 21 with their inability to stretch. In this respect, it is preferred that the cords be of steel or some other strong metal that have virtually no stretchability and be set at from 10 to 25 cords per inch of width. The cords are wound helically to enable the individual cord ends to terminate at each end of shell 21 thus obviating the necessity of cord splicing on shell 21 which would be a potential weak spot. The angle $\alpha$ of the cords to a plane perpendicular to shaft 7 should be kept within about 4°–12° with a preferred angle of 8°. At angles less than about 4° the layer becomes difficult to handle during the construction of the shell 21 whereas at angles greater than about 12° the distortion resistance of center shell 77 begins to deteriorate. The layers of center shell 77 are in pairs and are placed so the cords in adjacent layers are aligned at alternating equal acute angles $\alpha$ to balance the distortion resistance of all the layers.

The cords should be in a spaced apart arrangement preferably in some sort of a pattern. The greatest degree of cord strength is obtained when the cords are evenly spaced apart, however, patterns containing a plurality of cords in separate parallel bundles are also usable herein.

As a specific example of the construction of center shell 77, for a 22 inch outer diameter finished shell 21, a 90 mil layer of spaced steel cords (50 mil diameter cords equally spaced 12 to the inch) in a cured elastomeric matrix is fashioned as aforedescribed into a belt 8 9/32 inches wide and 549 11/16 inches long and then cut at an 8° angle with the cords; the length of the cut is 61 11/16 inches long. Starting at one end of shell 21, this belt is wrapped helically about inner shell 75 so that the ends of the wires are spaced evenly about the circumferential edge of shell 21. Thereafter, a second 90 mil thick belt 8 21/32 inches wide and 546 21/32 inches long is cut at an 8° angle with the cords to give a 62¼ inch cut length and thereafter wrapped in the opposite angular direction, i.e., 8° with a plane perpendicular to shaft 7, to provide a compensating helically wound layer over top of the first layer. In shell 21 therefore will be distortion resistant center shell 77 consisting of two layers of cords in cured elastomer matrices aligned at alternating 8° angles with a plane perpendicular to shaft 7. More layers than are shown in FIG. 4 may be used; however, for most operations two layers are sufficient.

In calculating the dimensions of the layers of center shell 77, the following formulas may be used:

$L_f$ = roll width sin $\alpha$
$L_e$ = roll diameter × $\pi$
$L_p$ = roll diameter × $\pi$ × cos $\alpha$
$L_t = L_f + L_p$ = (roll width sin $\alpha$) + (roll diameter × $\pi$ × cos $\alpha$)
$W$ = roll diameter × $\pi$ × sin $\alpha$ where $L_f$ is the length of the (flat) side of the layer, $L_e$ is the length of the end of the layer, $L_p$ is the length of the end of the layer projected to the (flat) side of the layer, $W$ is the width of the layer, $\alpha$ is the angle of the cords in the layer to a plane perpendicular to shaft 7, and $L_t$ is the total length of the layer. Thus, for a roll of 9.295 inches in diameter, 16 inches wide, and wrapped at an 8° angle the layer would have the following dimensions:

$L_f$ = 16 sin 8° = 114.965 inches
$L_e$ = 9.295 × $\pi$ = 29.201 inches
$L_p$ = 9.295 × $\pi$ × cos 8° = 28.917 inches
$L_t$ = 114.965 + 28.917 = 143.882 inches $W$ = 9.295 × $\pi$ sin 8° = 4.064 inches The calculations for the next and succeeding layers must, of course, take into account the increase in roll diameter due to the thickness of the preceeding layer or layers.

As shown in FIG. 5, the layers of cords in elastomeric matrices of inner shell 75 are looped about circular wire bead 71 positioned at the end of shell 21. The layers are alternately lapped over and under bead 71 to reduce the bulging caused by the overlapping. Bead 71 comprises a circular assembly of steel or other metal wires in a generally square cross-section that is encased or embedded in an uncured elastomeric matrix of slightly less diameter than shell 21. Bead filler 79, comprising a strip of uncured elastomeric material having a suitable triangular cross-section is placed on the outer edge of bead 71 to fill the space created by the return loop or overlap configuration of the layers of inner shell 75 about bead 71. Over the exposed surface of the layers looped about beads 71 is placed chafe protecting pad 81, that comprises a layer of high abrasion resistant elastomeric material that prevents chafing of the layers by the surface of recess 69 during operation of bed roller 1.

Over center shell 77 and fully bonded thereto is outer shell liner 83 that comprises at least one layer of cured elastomeric material whose outer surface will be the working surface for contact with work roller 3 shown in FIG. 1. Outer shell liner 83 comprises layers of elastomeric material similar to that of shell liner 63, i.e., without reinforcing cords; it may be used in a smooth condition or patterned to emboss sheets of material. The elastomer of outer shell liner 83 is preferably a hard elastomer such as a 65 Durometer hardness rubber compound. In addition, shell liner 69 may comprise one layer but is preferably made up of a plurality of layers, such as nine layers in the case of the aforedescribed 22 inches outer diameter roller.

The preferred type of construction of this invention comprises a single inner shell liner 73 of a fluid impervious elastomeric material, four to five layers of textile cords in elastomeric matrices forming inner shell 75, two layers of steel cords in elastomeric matrices forming center shell 77, and about nine layers of ⅛ inch thick 65 Durometer elastomeric material forming outer shell liner 83.

Bed roller 1 may be made by first forming a cylindrical mandrel of the collapsible type, generally this is made up of a number of segments that may be later dismantled and removed piece by piece. Over the mandrel is wrapped (unvulcanized) inner shell liner 73 and then consecutively the (unvulcanized) layers forming inner shell 75, the (unvulcanized) layers forming center shell 77, and the (unvulcanized) layers forming outer shell liner 83. Beads 71 are inserted at both ends of the mandrel and as each layer is laid down, the ends are turned alternately up over the bead and down over the bead. Finally, chafing pads 81 are wrapped over the layers looped about beads 71 and fluid-tight mounting means 23 attached as the mandrel is disassembled and removed. Shell 21 is then pressurized to its ultimate working pressure, e.g., 400 psi via means 25. Several layers of cloth are then wrapped tightly about shell 21 and saturated with water. Shell 21 is then inserted in an open steam oven at approximately 288°F. for 3½ hours. The heat from the open steam vulcanizes the elastomeric materials in shell 21 into an integral unit. Shell 21 is thereafter removed from the oven and unwrapped and subjected to a surface buffing wherein the imperfections in outer shell liner 83 are removed. Outer shell liner 83 may be easily replaced by grinding down to center shell 77, wrapping a new liner 83 thereon and vulcanizing it into bonded adherence to shell 77.

The elastomeric materials in the various components of shell 21 may be chosen from a wide range of polymeric materials depending upon the intended use and working pressure of bed roller 1. Examples of elastomers for use herein include natural rubber and synthetic rubbers such as acrylic rubber, butadiene-styrene rubber (SBR), chloroprene (CR), chlorosulfonated polyethylene, fluorocarbon, isobutylene-isoprene (IIR), isoprene (IR) and Butadiene (BR) rubber, nitrile-butadiene (NBR), ethylene-propylene-diene rubber (EPDM), polyisobutylene, polysulfide rubber, silicone rubber, and urethane rubber. In addition, other polymeric materials may be added to the elastomer such as thermoplastics, e.g., polystyrene, polyvinyl chloride, polypropylene, polyvinylidene chloride, and thermosetting plastics such as polyesters, urea-formaldehyde resins, etc.

What is claimed is:

1. In a variable pressure bed roller for calendering sheets of pliable materials which roller comprises in combination a rotatable shaft, a pair of axially spaced, rigid, circular closure members of substantially equal diameters mounted on said shaft, an elastomeric, fluid-impervious, cylindrical shell having an internal diameter substantially equal to the diameters of and extending between said closure members, said shell including cord reinforcement throughout the length thereof, first means providing fluid tight mounting of said closure members on said shaft, and second means providing a fluid tight connection between said shell and said closure members, the improvement wherein said cord reinforcement in said shell consists essentially of a. at least one inner cylindrical layer of spaced, substantially mutually parallel cords aligned substantially parallel to said shaft, said layer extending from one closure member to the other and
   b. an even number of distortion resistant, cylindrical layers of spaced substantially mutually parallel cords aligned at alternating substantially equal acute angles relative to a plane perpendicular to said shaft, said even number of layers bonded to and spaced radially outwardly from said at least one inner layer and extending from one closure member to the other.

2. The improved roller of claim 1 wherein said cords in said inner layer comprise materials selected from the group consisting of glass, polyester, nylon, rayon, cotton and steel.

3. The improved roller of claim 1 wherein said cords in said distortion resistant layers comprise fibers selected from the group consisting of glass, polyester nylon, rayon, cotton and steel.

4. The improved roller of claim 1 wherein said substantially equal acute angles are between about 4° and about 12°.

5. The improved roller of claim 4 wherein said substantially equal acute angles are 8°.

* * * * *